March 28, 1939 O. STEINER 2,152,221
FILM FEEDING DEVICE
Filed Sept. 23, 1936
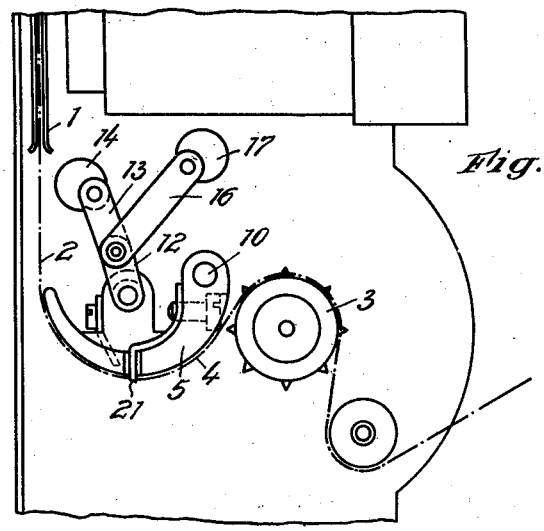
Fig. 1
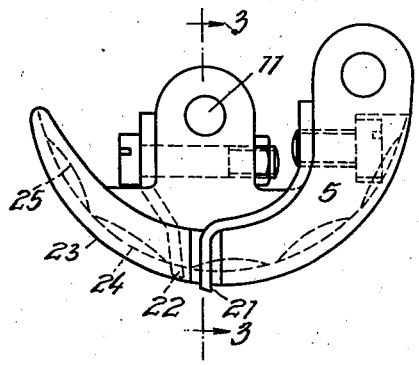
Fig. 2
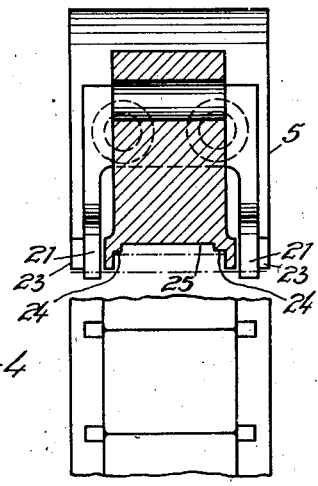
Fig. 3
Fig. 4
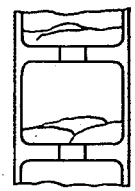
Fig. 5
Inventor
Otto Steiner
by Knight Bro.,
Attorney Patented Mar. 28, 1939

2,152,221

UNITED STATES PATENT OFFICE 2,152,221

FILM FEEDING DEVICE

Otto Steiner, Berlin-Spandau, Germany, assignor to Siemens & Halske, Aktiengesellschaft, Siemensstadt, near Berlin, Germany, a corporation of Germany Application September 23, 1936, Serial No. 102,109
In Germany October 3, 1935

4 Claims. (Cl. 88—18.6)

My invention relates to improvements in film feeding devices for cinematograph apparatus of the kind in which a feed member or beater is adapted in its shape to the form of a loop or curve formed in the film between the picture aperture and a take-up sprocket wheel in the apparatus.

My invention has for its object to improve such feeding devices by making them suitable for feeding films of different widths and/or for films in which the spacing of the pictures or frames is different.

According to the invention the beater of the film feeding device has a plurality of film-engaging guide surfaces which are adapted to films of different sizes, that is to say, of different widths and/or different frame spacings.

Preferably, one or more film-engaging surfaces for narrower films, for example for films 9.5 mm. in width, are arranged between engaging surfaces for a wider film, for example for films 16 mm. in width, on the beater. Such arrangement not only avoids a widening of the beater as would be occasioned if the engaging surfaces were arranged side by side, but makes it also possible that all the different sized films to be accommodated can be located centrally with respect to the optical axis without alteration in setting of the apparatus.

According to another feature of my invention the differences in the frame spacing in films of different sizes are allowed for by locating the film supporting surfaces allocated to the different sizes of film at different distances radially with respect to the pivot of the beater. The feed stroke of the beater may then be the same for all the different sizes of film.

The guide surface for films in which the sprocket holes are located between the frames is preferably fluted, i. e. provided with cut-out portions or recesses at those places where the actual picture portions of the frames lie, so that these films, for example, films of 9.5 mm. width, are only engaged at the edges and between the frames.

It is also known with film feeding devices of the kind referred to, to provide the beater itself with means which by the action of the beater on the film strip limits the length of the stroke and counteracts the tension of the film between the beater and the sprocket wheel at least towards the end of a feed stroke.

According to a further development of my invention, the beater having guide surfaces adapted to films of different sizes, is also provided with means which limit the feed stroke of the different sizes of films. Preferably the means for limiting the feed stroke comprise teeth which are so arranged with respect to the guide surfaces and to each other that any injury to wider films by the teeth intended for narrower films is made impossible.

If the cinematograph apparatus is to be suitable for films of 16 mm. in width and for films of 9.5 mm. in width, preferably a laterally arranged tooth or a pair of teeth for the first mentioned size of film and a tooth located in the centre of the beater for films of 9.5 mm. in width are provided. The tooth intended for the films of 9.5 mm. in width may be arranged in the range of one of a number of cross-bars on the beater which engage the film substantially between the frames of the film only.

An example of film feeding device constructed in accordance with the invention is represented in the accompanying drawing, in which:

Fig. 1 shows a side view of the complete feed mechanism;

Fig. 2 shows a side view of the beater in a larger scale than Fig. 1;

Fig. 3 shows a section through the beater on the line 3—3 of Fig. 2;

Fig. 4 shows an elevation of a portion of a film 16 mm. in width and

Fig. 5 shows an elevation of a portion of substandard film 9.5 mm. in width, these films having the sizes for which the feed mechanism shown in Figs. 1 to 3 is suited.

Referring to the drawing, 1 indicates the film guide which contains the picture aperture and through which the film 2 is to be fed from the top downward. A take-up sprocket wheel 3 which requires to be changed when transferring from one size of film to another is driven by the gearing of the cinematograph apparatus with a uniform rate of rotation. Between the film guide and the sprocket wheel 3 a beating lever 5 is mounted which is arranged to be oscillated about a pin 10. The beating lever receives its oscillating movement through cranks 14 and 17, the crank 14, acting through a connecting rod composed of articulated members 12 and 13, produces the actual feed stroke for the beater while the crank 17, by means of a link 16 coupled to the connecting pin for the members 12 and 13, is arranged to shorten and lengthen the connecting rod 12, 13 periodically in such a manner that the film is fed forward with each third rotation of the crank 14. For this purpose the crank 17 makes one revolution during each picture alternation while the crank 14 makes three revolutions. The feed mechanism as so far described is of known arrangement.

In accordance with the present invention the beater 5 is provided with a number of separate guide surfaces for films of different sizes. Thus, in the example shown, two outer guide surfaces 23, Figs. 2 and 3, for films 16 mm. in width are provided and guide surfaces 24 for films 9.5 mm.

in width are located between the surfaces 23. The surfaces 24 are located at such a shorter distance radially than the surfaces 23 that the differences in the feed strokes of the two sizes of film are allowed for.

In order to ensure that in effecting the forward movement of films 9.5 mm. in width, the actual picture portions of the film frames shall not rest against the beater, cut-out portions or recesses 25 shown in dotted lines in Fig. 2 may be provided. These recesses are somewhat narrower than the inclusive overall width of the guide surfaces 24 for films of the said smaller size and cross bars are left between them on a level with the guide surfaces, so that films 9.5 mm. in width are only engaged at their edges and between the frames of the film. With respect to the guide surfaces for films 16 mm. in width a hollow or recess is naturally afforded adjacent to the actual picture portions of the film if, as shown in Fig. 3, the support for the narrower size of film is placed between the surfaces 23 for the wider film and at a smaller distance radially from the pin 10.

For effecting the exact limitation of the stroke of the film feed mechanism the beater 5 is provided with a tooth 21 (or a pair of teeth) which, during the effective operating stroke of the striker first engages in a sprocket hole (or a pair of sprocket holes in the case of two teeth) of the film and in the continued feed movement abuts against the leading edge of the hole or holes. The arrangement of such a tooth or pair of teeth is known for beaters adapted for use with one size of film only.

In accordance with the invention there is provided in addition to the two laterally spaced teeth 21 provided for films of 16 mm. in width in the example described, a further tooth 22 (Fig. 2) located in the centre of the width of the beater 5. This tooth co-operates, in the example, with the sprocket holes arranged between the frames of a film 9.5 mm. wide. When feeding films 16 mm. in width the tooth 22 need not be removed because it projects only beyond the film supporting surfaces 24 which are located at a sufficient distance below the guide surfaces for the 16 mm. film to avoid any contact between the tooth 24 and a 16 mm, film. The position of the tooth 22 with respect to the flutes or recesses 25 is such that it lies between two such flutes, that is on one of the ridges.

The film feeding device described may also be constructed for other than the said sizes of film and if desired for more than two sizes, it only being necessary to adapt the teeth 21, 22 and the guide surfaces 23, 24 to the number dimensions and sprocket hole arrangements of the different sizes of film.

I claim as my invention.

1. In a motion picture apparatus having a film gate and a sprocket wheel for continuously transporting the film, in combination, a single beating lever disposed between said film gate and said sprocket wheel and designed to periodically engage and lengthen a loop portion of the film, said lever having a plurality of stepped guide surfaces for guiding and impelling films of different widths, said guide surfaces for wide films projecting over those for narrow films in direction of the active beating movement of said lever, cross bars between the inner guide surfaces and on a level therewith, a feeding tooth at one of said cross bars, and a mechanism connected with said beating lever for causing said lever to effect feeding beats of a constant beating angle.

2. In a motion picture apparatus having a film gate and a sprocket wheel for continuously transporting the film, in combination, a single beating lever disposed between said film gate and said sprocket wheel and designed to periodically engage and lengthen a loop portion of the film, a drive mechanism connected with said lever and designed for imparting to said lever feeding movements of a constant beating angle, said lever having a plurality of approximately cylindrical guide surfaces shaped similarly to said loop portion and disposed to contact and impel films of different widths, said guide surfaces for different films being arranged substantially concentrically, cross bars between the inner guide surfaces and on a level therewith, the guide surfaces for narrower films being arranged between said guide surfaces for wider films and having a smaller radius than those for wider films, so that the same lever movement effects a different feeding length according to the different film widths.

3. In a motion picture apparatus having a film feeding device adapted to feed the film by periodically lengthening a loop portion of the film arranged between the picture aperture and a continuously transporting sprocket wheel, an oscillatory single beating lever forming part of said feeding device, said lever having different beating surfaces, having its general shape formed similarly to said loop portion, and being designed to contact and impel films of two different widths, the surfaces for the narrower films having a fluted shape so as to have recesses at the places of the actual film pictures and ridges between said pictures, whereby said narrower films are contacted by said lever only at their edges and between the pictures.

4. In a motion picture apparatus, in combination, a sprocket wheel disposed to be changed by other wheels for transporting films of different widths, means for continuously driving said sprocket wheel, a film feeding device adapted to feed the film by periodically lengthening a loop portion of the film arranged between the picture aperture of said apparatus and said sprocket wheel, said feeding device having an oscillatory beating lever and a mechanism for causing said lever to effect feeding beats of a constant beating angle, said lever having a plurality of guide surfaces shaped similarly to said loop portion and disposed to impel films of different widths, part of said guide surfaces being adapted to narrow films with sprocket holes between the frames of the film pictures, the latter guide surfaces having a fluted shape forming recesses at the places of the actual film pictures and ridges between said recesses, so that said narrow films are contacted only at their edges and between the frames, an adjusting tooth for each of said different films disposed on said lever so as to enter into a sprocket hole of the film and to adjust said film during the feeding movement of said member, the tooth allotted to said fluted guide surfaces for narrow films being located in one of said ridges.

OTTO STEINER.